May 12, 1953     H. HILLIER     2,638,078
LIQUID LEVEL REGULATOR
Filed Jan. 7, 1947     4 Sheets-Sheet 1

INVENTOR
Harold Hillier
BY
ATTORNEYS

Patented May 12, 1953

2,638,078

UNITED STATES PATENT OFFICE 2,638,078

LIQUID LEVEL REGULATOR

Harold Hillier, Cathcart, Glasgow, Scotland, assignor to G. & J. Weir Limited, Cathcart, Glasgow, Scotland, a corporation of Great Britain Application January 7, 1947, Serial No. 720,663
In Great Britain January 7, 1946

1 Claim. (Cl. 122—451.2)

This invention relates to apparatus for controlling the flow of liquid into a vessel in accordance with the withdrawal from the vessel of such liquid either as a vapor or in its liquid state, the greater portion in normal working being drawn off in the vapor state. In particular, the invention applies to apparatus for controlling the flow of feed water from a feed water system into the boiler of a steam generating plant to maintain the water level in the boiler between desired levels.

The invention relates particularly to apparatus in which the valve controlling the flow of feed water into the boiler is actuated by the liquid pressure in the feed system in accordance with variations in the vapor flow from the boiler and variations in the water level inside the boiler.

The object of the invention is the improvement of steam generator installations of the type including a steam generator, a steam superheater and a steam consumer, but including therein means for controlling the supply of water to the installation in accordance with variations in the vapor flow from the boiler and variations in the water level inside the boiler.

According to my invention, I include in the steam generator installation referred to above, a feed water control valve for controlling the flow of feed water from a source of supply to the steam generator, for example, the steam generator drum, the feed water control valve including a housing having inlet and outlet connections for the flow of feed water, a valve seat between the connections, a movable valve member cooperating with the valve seat and arranged to be moved from the seat by the pressure of the feed water supplied to the inlet connection. The feed water valve preferably includes a cylinder in the housing defining with the housing a control chamber having a piston therein operatively connected with the valve member, a duct being provided for bleeding feed water under the pressure of the inlet connection into the control chamber, a pair of water discharge conduits connected into the control chamber for bleeding water therefrom and for in turn varying the result therein for effecting the operation of the piston and valve member.

The installation includes a control valve in each of the discharge conduits leading from the control chamber, one of which is operatively connected with and is responsive to the operation of a water level responsive means, responsive to changes in the level of the water in the drum of the generator, while the other of said control valves is operatively associated with and responsive to the operation of a means responsive to changes in pressure drop between the steam supplied to and the superheated steam discharged from the steam superheater. In the steam generator installation provided with the controls described in general above, the rate at which the water is bled from the control chamber of the feed water control valve through the two conduits and the rate of water supplied to the generator are controlled by the combined action of the two means respectively responsive to the changes in level of the water in the steam generator and the changes in pressure drop across the steam superheater.

In order that the nature of the invention may be better understood, a typical application of the apparatus for operation in the feed system of a steam generator installation will now be described and illustrated in the accompanying drawings, in which:

Fig. 1 is a diagrammatic view of a steam generator installation in which the various elements of the system of the invention are shown diagrammatically in relation to each other, the installation as shown including a steam generator, a steam superheater, a steam consumer, a feed control valve, and float-operated and pressure-operated needle valves cooperating for the control of the feed water valve;

Figure 1:
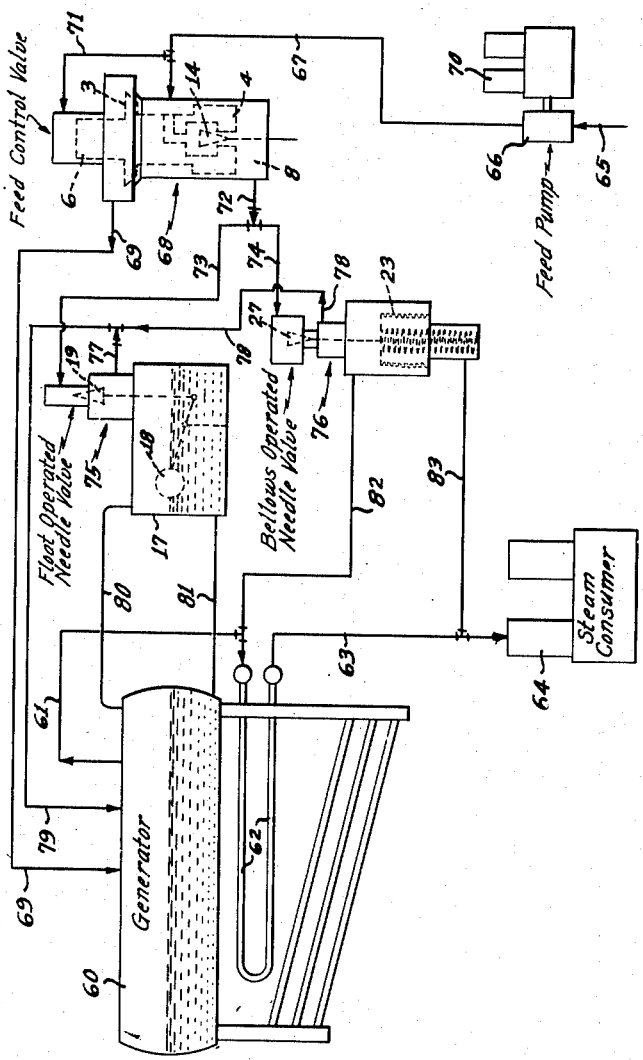

Referring to Fig. 1 of the drawings illustrating a steam generator installation including the control features according to the invention, it will be noted that the installation includes a conventional type steam generator having a steam and water drum 60. Steam produced in the steam generator is conducted from the steam and water drum 60 through a steam pipe 61 into a steam superheater 62, from which superheated steam is conducted through a pipe 63 into a steam consumer 64, such as a steam turbine or other prime mover or point of utilization for superheated steam.

Feed water is supplied to the steam generator installation through a pipe 65, a pump 66, pipe 67, feed control valve 68 and a delivery pipe 69. The pump 66 is driven by a suitable motor or prime mover 70. The feed water control valve 68 is automatically controlled, as described more in detail hereinafter, in connection with a valve closure means 3 comprising a part of lower and upper pistons 4 and 6. Water is normally conducted through a passageway 71 to a chamber above the piston 6 so that the water pressure in the line 67 normally tends to seat the valve closure 3. However, the piston 4 of larger diameter controls the opening of the closure 3 in response to the build up and release of leakage water at inlet pressure flowing around a needle valve 14 into a control chamber 8.

Leakage water conducted from the control chamber 8 of the feed control valve 68 is conducted through a pipe 72 into branch pipes 73 and 74, respectively delivering leakage water to a float-operated needle valve unit 75 and a bellows-operated needle valve unit 76. Leakage water passed under controlled conditions through the valves 75 and 76 flows into pipes 77 and 78, respectively, from which the leakage water is delivered through a pipe 79 into the steam and water drum 60. The unit 75 includes a float chamber 17 connected to the drum 60 by a steam pipe 80 and by a water pipe 81, so that the level in the chamber 17 will be the same as that in the drum 60. The bellows-operated needle valve unit 76 includes a bellows 23 for operating a needle valve 27 in response to the pressure drop across the steam superheater. Accordingly, the outside of the bellows 23 is connected by a pipe 82 to the steam pipe 61, while the inside of the bellows is connected by a pipe 83 to the superheated steam line 63.

Figure 2:
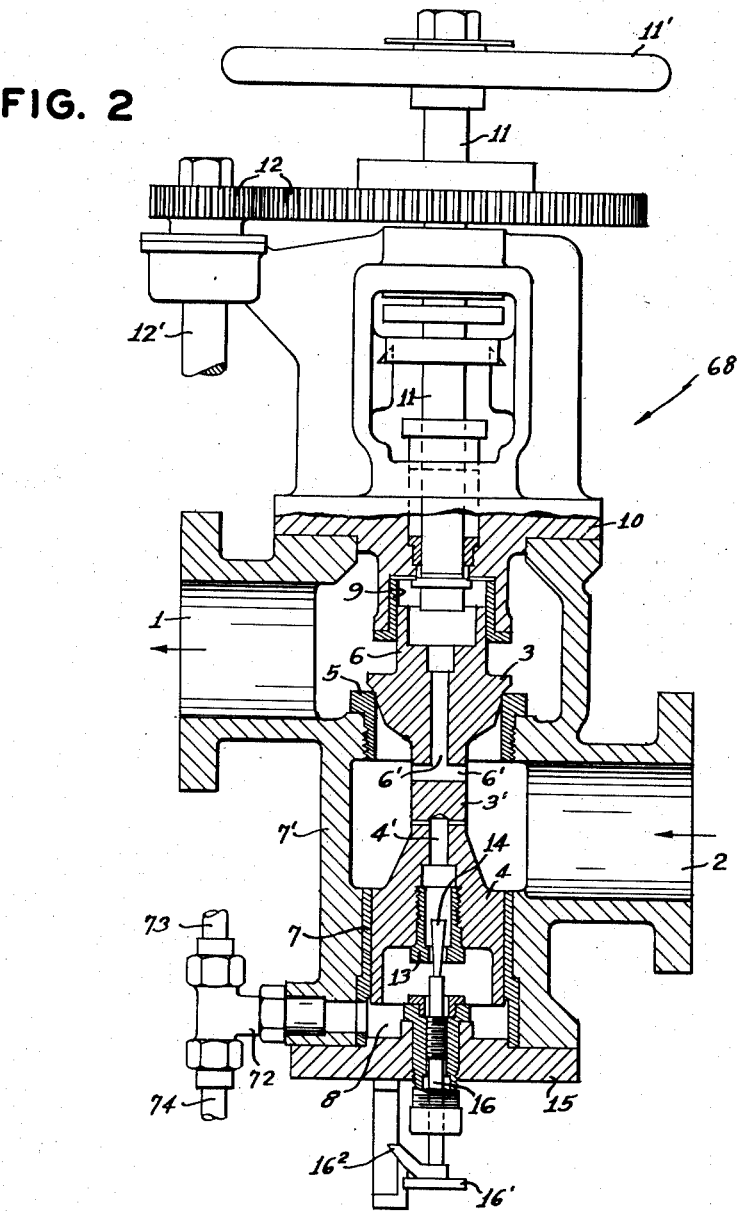
Fig. 2 is an enlarged broken vertical sectional view of the feed water control valve unit shown in Fig. 1.

The feed water control valve 68 of Fig. 1, as shown in detail in Fig. 2, includes a water outlet branch 1, subject to the boiler pressure through pipe 69, and an inlet branch 2, said inlet branch being subject to the feed pressure in the feed supply line 67. The valve is provided with a closure means 3 carried on a stem 3' extending to form a lower piston 4 having a diameter equal to the bore through the valve seat 5, and an upper piston 6 having an effective area of approximately half the effective area of the lower piston 4. The lower piston 4 is guided in a cylinder 7 provided in the base of the valve body 1', the space under the piston 4 forming a control chamber 8 for providing an intermediate pressure for controlling the movements of the feed valve closure 3. The upper piston 6 is guided in a cylinder 9 provided in the cover 10 of the valve, the cover being provided with a spindle 11, a hand wheel 11' and screw gears 12 whereby the valve closure 3 can be secured in the closed position on its seat 5 when desired. The gears 12 may be operated by a power shaft 12'.

The upper piston 6 and stem 3' are provided with holes 6' whereby the feed inlet pressure can be communicated to the top of the small piston 6 so that the top of the small piston is at all times subjected to the feed inlet pressure. When the valve closure 3 is seated by operation of the shaft 11, the end of this shaft will also close off the passageway 6'. Communicating holes 4' drilled through the stem 3' of the valve 3 and piston 4 allow leakage water to flow from the feed inlet to the control chamber 8. The outlet of this flow to the chamber 8 is provided with a needle-valve seat 13 adapted to coact with an inverted tapered needle-valve 14 which is inserted through a cover 15 in the base of the valve body and provided with screw gear 16 whereby the position of the tapered needle-valve 14 can be varied in relation to the needle-valve seat 13. When the feed valve closure 3 is in closed position, the area for flow from the feed inlet 2 to the control chamber 8 through the seat 13 is a maximum and is reduced progressively as the feed valve closure lifts until it reaches a minimum when the feed valve is wide open. The screw 16 may be rotated by a hand wheel 16' and retained in position by a catch 16².

Figure 3:
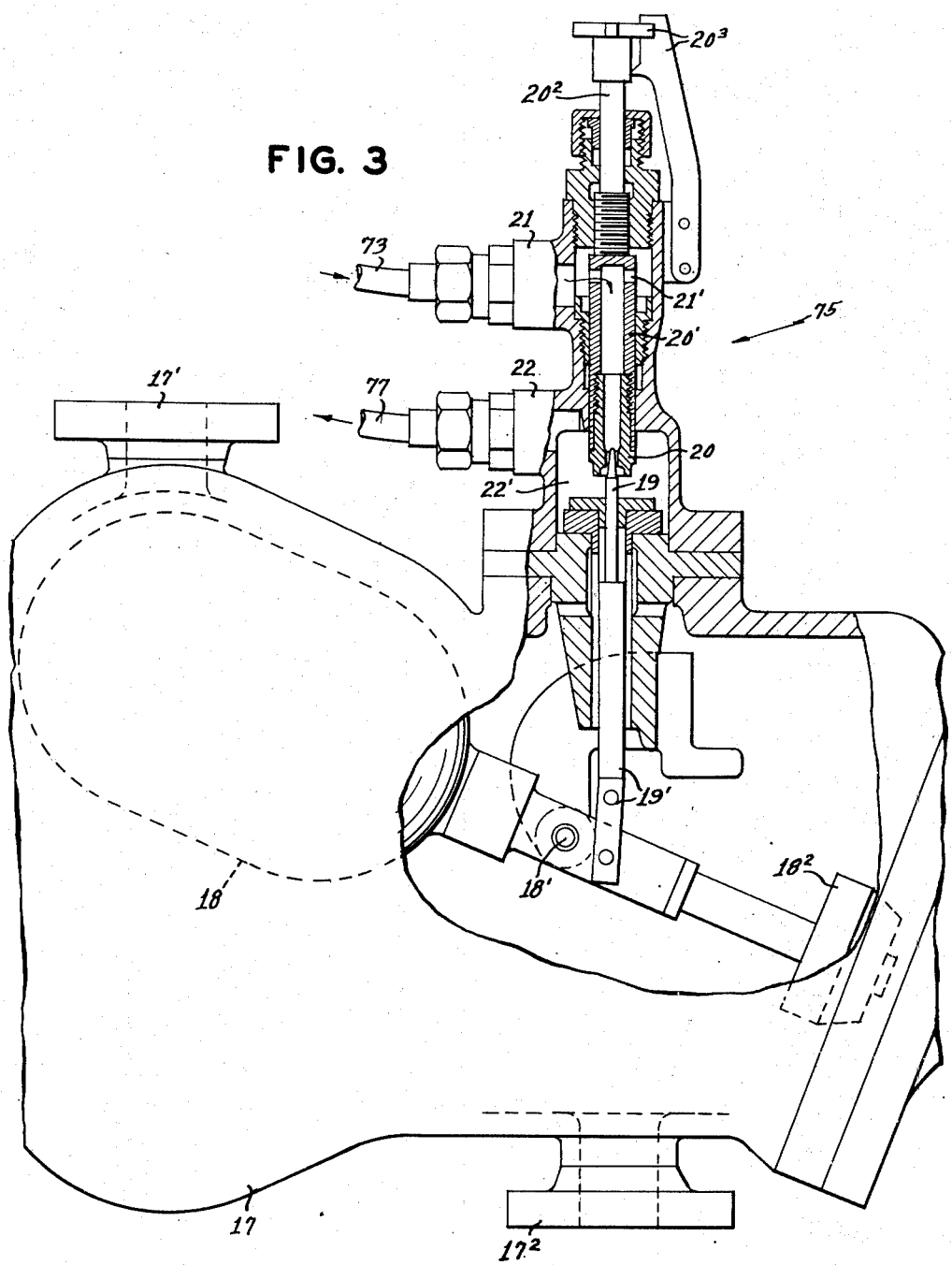
Fig. 3 is a broken vertical sectional view of the float-operated needle valve unit, as shown in Fig. 1 but on a larger scale.

Figure 3 of the drawings shows the details of the structure and arrangement of the float-operated needle valve 19 of Fig. 1. In Fig. 3, 17 denotes a float box or chamber so attached to the boiler drum 60 by steam and water connections 80 and 81, attached at 17' and 17², that the water level in the float box is substantially the same as the water level in the steam and water drum 60. The float 18 in the chamber 17 is pivoted at 18', balanced by a counterweight 18², and operates a tapered needle-valve 19 through a linkage 19'. The needle valve 19 co-acts with a vertically adjustable needle-valve seat 20 set in a sleeve 20', for controlling the flow of a part of the leakage water from chamber 8 of the feed control valve 68, so that the flow of leakage water varies from a maximum when the float is in the top position to a minimum when the float is in its lowest position. The sleeve 20' is connected at the top to a threaded spindle 20² for raising and lowering the valve seat 20, the spindle being restrained against rotation by a known type of ratchet means 20³.

The control chamber 8 of the feed valve 68 is connected by a pipe 73 through an inlet connection 21 and openings 21' in sleeve 20' to the float-operated tapered needle-valve unit, the discharge connection 22 from the float-operated needle-valve unit leading from chamber 22' around the valve elements 19 and 20 from which leakage water passing through the valve seat 20 flows through pipes 77 and 79 to the boiler drum 60.

Figure 4:
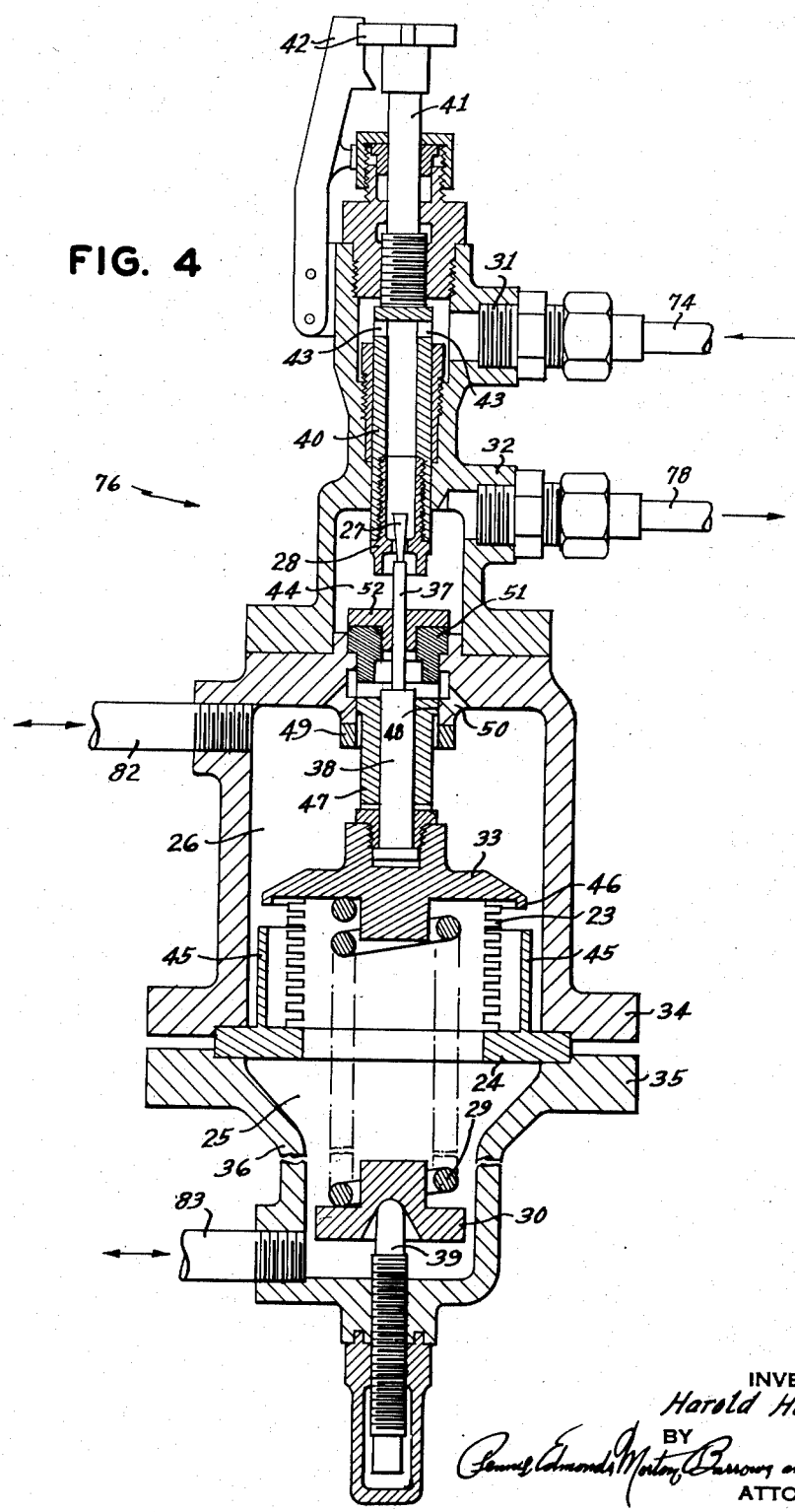
Fig. 4 is a broken vertical sectional view of the bellows-operated needle valve unit as shown in Fig. 1 but on a larger scale.

Figure 4 of the drawings shows the structural details and arrangement of the parts of the pressure-responsive bellows-operated needle valve 76, of Fig. 1, for controlling the flow of leakage water from the feed control valve 68. The structure of Fig. 4 comprises a "Sylphon" bellows 23 secured at one end to a ring 24 and at the other end to a plate 33.

In the chamber 25 associated with the inside of the bellows 23 and casing 36 a spring 29 is arranged between plate 33 and a spring cap 30, the latter being carried on a screw 39 for adjusting the load of the spring, the bias of the spring opposing the pressure from the boiler drum in chamber 26 on the outside of the bellows. A fall in pressure in the connection 83 to the superheater outlet 63 caused by increasing steam flow permits the boiler drum pressure to compress the spring and moves the tapered needle-valve 27 relatively to its co-acting seat 28 in such a manner that the flow of leakage water through such valve decreases from a maximum at zero boiler load to a minimum at maximum boiler load. The seat 28 is carried by a sleeve 40, in turn connected at the top to a threaded spindle 41 for raising and lowering the valve seat, the spindle 41 being restrained against accidental rotation by a known type of ratchet-like means 42. Leakage water supplied through the pipe 74 enters the valve through an inlet connection 31, passes through openings 43 to the sleeve 40, through valve seat 28, into a chamber 44 and through an outlet connection 32 to the pipe 78.

The valve structure shown in Fig. 4 includes means for controlling the movement of the bellows 23 and the plate 33 in response to changes in the pressure difference between chambers 25 and 26, such means comprising a stop 45 engageable by a rim 46 for limiting the extent of the downward movement of plate 33, and a guide structure arranged between the plate 33 and the top of the chamber 26. This latter structure includes a sleeve 47 attached to plate 33 extending around shaft 38 and having an upper vertical cylindrical surface 48 movable relative to a cylindrical guide member 49 carried by the top of the chamber 26. Passageways 50 in the top wall of the chamber lead into spaces above the sleeve 47 and shaft 38 to apply steam pressure thereto. The upward movement of the plate 33 is limited by the sleeve 47 engaging a bushing member 51 carrying the packing member 52 through which the shaft 37 extends.

The flow of leakage water through the bellows-operated valve unit 76 varies from a maximum at zero boiler load and a high float level to a minimum at maximum boiler load and a low float level, there being a corresponding intermediate quantity of leakage water for any given intermediate boiler load and an intermediate float level.

The feed valve 68 is balanced in respect of the feed inlet pressure while the top of the small piston 6 is subjected continuously to the feed inlet pressure. The bottom of the large piston 4 is subjected to the pressure in the control chamber 8, and, for equilibrium, it will be approximately mid-way between the feed inlet pressure and the boiler pressure. Water leaks into the control chamber 8 through the clearance between the large piston and its associated cylinder and through the variable orifice provided by the inverted tapered needle-valve 14 co-acting with the seat 13 in the large piston 4. The flow of the water from the control chamber 8 is controlled by the positions of the float-operated needle-valve 19 and the bellows-operated needle-valve 27, the flow permitted by these valves determining the pressure underneath the large piston 4 of feed valve 68. When the steam flow, the boiler level and the feed flow are in equilibrium, the intermediate pressure in the control chamber 8 will maintain the feed valve closure 3 in a steady position corresponding to the desired feed flow. Variations of water level and steam flow will modify the leakage flow and cause the position of the feed valve closure 3 to change as necessary to modify the feed flow accordingly.

When swelling occurs as a result of an increase in boiler load, the leakage flow controlled by the float 18 will be increased, but the leakage controlled by the bellows 23 will be decreased, thereby preventing any large reduction in the flow of feed water into the boiler. Conversely, if subsidence occurs when the boiler load is reduced, the float-controlled needle-valve 19 will decrease the flow of leakage water, but the bellows-operated needle valve 27 will increase the flow of leakage water, thereby preventing any undue increase in the flow of feed water into the boiler.

What is claimed is:

In a steam generator installation including a steam generator comprising a steam and water drum, a steam superheater, a steam consumer, conduit means for supplying steam from the steam generator to the steam superheater, a conduit for delivering superheated steam from the steam superheater to the steam consumer, means responsive to changes in the level of water in the steam and water drum of the generator, means responsive to changes in the pressure drop between the steam supplied to the superheater through said conduit means and the superheated steam delivered from the steam superheater through said conduit to the steam consumer, a feed water control valve for controlling the flow of feed water from a source of supply to the steam generator, said feed water control valve including a housing having inlet and outlet connections for the flow of feed water and having therein a valve seat between said connections, a movable valve member cooperating with said seat and arranged to be moved from its seat by the pressure of the feed water supplied to the inlet connection, a cylinder in said housing defining therewith a control chamber having a piston therein operatively connected with said valve member, conduit means for bleeding feed water under the pressure of the inlet connection into said control chamber, the improvement comprising a pair of water discharge conduits connected into said control chamber for bleeding water therefrom to in turn vary the pressure therein for effecting operation of said piston and valve member, a control valve in each of said water discharge conduits for controlling the water bled through said discharge conduits, one of said control valves being operatively connected with and responsive to the operation of said water level responsive means, and the other of said control valves being operatively associated with and responsive to the operation of said means responsive to changes in the pressure drop between the steam supplied from the steam generator to the steam superheater and the superheated steam delivered from the steam superheater and conducted to the steam consumer, whereby the rate at which water is bled from said control chamber through the control valves in said conduits and the rate of water supply to the generator are controlled by the combined action of the means responsive to changes in the level of the water in the steam generator and the means responsive to changes in pressure drop across the steam superheater.

HAROLD HILLIER.

References Cited in the file of this patent

UNITED STATES PATENTS

| Number | Name | Date |
|---|---|---|
| 1,154,591 | Dodge | Sept. 21, 1915 |
| 1,991,929 | Hillier | Feb. 19, 1935 |
| 2,016,229 | Dight | Oct. 1, 1935 |
| 2,270,094 | Veenschoten | Jan. 13, 1942 |

FOREIGN PATENTS

| Number | Country | Date |
|---|---|---|
| 248,335 | Great Britain | Sept. 23, 1926 |
| 303,630 | Great Britain | Jan. 10, 1929 |
| 376,330 | Italy | Nov. 10, 1939 |
| 549,408 | Great Britain | Nov. 19, 1942 |
| 608,960 | Germany | Feb. 5, 1935 |
| 636,271 | Germany | Oct. 7, 1936 |
| 655,966 | France | Apr. 25, 1929 |